(12) United States Patent
Nagato et al.

(10) Patent No.: US 10,760,636 B2
(45) Date of Patent: Sep. 1, 2020

(54) ENGINE RECIPROCATIVE ROTATING MECHANISM AND METHOD FOR MANUFACTURING THE SAME

(71) Applicant: Mazda Motor Corporation, Aki-gun, Hiroshima (JP)

(72) Inventors: Kiyonori Nagato, Otake (JP); Takuya Kikuchi, Higashihiroshima (JP); Tsunehiro Mori, Aki-gun (JP); Koichi Hirata, Hiroshima (JP); Akira Sumitani, Higashihiroshima (JP); Rumiko Yamada, Hiroshima (JP); Toru Morishima, Hiroshima (JP); Rei Enokizono, Hiroshima (JP); Yuichi Shirasuna, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 35 days.

(21) Appl. No.: 16/165,756

(22) Filed: Oct. 19, 2018

(65) Prior Publication Data

US 2019/0120317 A1 Apr. 25, 2019

(30) Foreign Application Priority Data

Oct. 25, 2017 (JP) ................................. 2017-206565

(51) Int. Cl.
*F16F 7/10* (2006.01)
*F16F 7/116* (2006.01)
(Continued)

(52) U.S. Cl.
CPC ............ *F16F 7/1028* (2013.01); *F16C 7/023* (2013.01); *F16F 7/116* (2013.01); *F16F 15/02* (2013.01);
(Continued)

(58) Field of Classification Search
CPC .......... F16F 7/1028; F16F 15/02; F16F 7/116; F16F 2224/0208; F16F 2226/04; F16C 7/023; F16J 1/16; F02F 3/00
See application file for complete search history.

(56) References Cited

U.S. PATENT DOCUMENTS

2015/0075479 A1* 3/2015 Hirata .................. F02F 3/0069
123/193.6

FOREIGN PATENT DOCUMENTS

JP 2015151877 A 8/2015
WO 2013133189 A1 9/2013

OTHER PUBLICATIONS

Hartog, J.P. et al., "Vibrations et mouvements vibratoires dans l'industrie mecanique moderne", Dunod, Paris, 1936, p. 107-108.

* cited by examiner

*Primary Examiner* — Jacob M Amick
*Assistant Examiner* — Charles Brauch
(74) *Attorney, Agent, or Firm* — Alleman Hall Creasman & Tuttle LLP

(57) ABSTRACT

A second dynamic vibration absorber is higher in resonance frequency than a first dynamic vibration absorber. At least one of the resonance frequency of the first dynamic vibration absorber or the resonance frequency of the second dynamic vibration absorber is shifted from associated at least one of the first resonance frequency or the second resonance frequency such that a peak frequency of antiresonance occurring in a higher frequency region of the first dynamic vibration absorber than the resonance frequency of the first dynamic vibration absorber is substantially different from that of antiresonance occurring in a lower frequency region of the second dynamic vibration absorber than the resonance frequency of the second dynamic vibration absorber.

6 Claims, 9 Drawing Sheets

(51) Int. Cl.
*F16F 15/02* (2006.01)
*F16C 7/02* (2006.01)
*F16J 1/16* (2006.01)
*F02F 3/00* (2006.01)

(52) U.S. Cl.
CPC . *F16J 1/16* (2013.01); *F02F 3/00* (2013.01); *F16F 2224/0208* (2013.01); *F16F 2226/04* (2013.01)

ENGINE RECIPROCATIVE ROTATING MECHANISM AND METHOD FOR MANUFACTURING THE SAME

CROSS-REFERENCE TO RELATED APPLICATION

This application claims priority to Japanese Patent Application No. 2017-206565 filed on Oct. 25, 2017, the entire disclosure of which is incorporated by reference herein.

BACKGROUND

The technique disclosed in this specification relates to an engine reciprocative rotation mechanism including a piston reciprocating in a cylinder, a connecting rod connecting the piston and a crankshaft together, and first and second dynamic vibration absorbers provided to the piston or the connecting rod, and a method for manufacturing such a mechanism.

In general, in an engine mounted in a vehicle such as a motor vehicle, a piston reciprocating in a cylinder is connected to a crankshaft through a connecting rod. Specifically, the piston is connected to a small end of a connecting rod through a piston pin, and the crankshaft is connected to a large end of the connecting rod. Conventionally, various techniques of reducing noise generated during the operation of the engine have been developed.

Japanese Unexamined Patent Publication No. 2015-151877 discloses, in order to solve a problem that a piston, a piston pin, and a small end of a connecting rod which are connected together collectively resonate with respect to a large end of the connecting rod in a combustion stroke of an engine, providing the interior of the piston pin with a dynamic vibration absorber to reduce a resonance vibration level. Japanese Unexamined Patent Publication No. 2015-151877 further discloses, in order to solve a problem of relatively increasing a resonance vibration level in a crankshaft and a cylinder block in a situation where the dynamic vibration absorber is disposed inside the piston pin, disposing not only the dynamic vibration absorber (a first dynamic vibration absorber) for reducing the vibration level by resonance in, e.g., a piston pin, but also a second dynamic vibration absorber having a different resonance frequency from the first dynamic vibration absorber in a through hole of the piston pin to reduce the vibration level by resonance in, e.g., the crankshaft.

SUMMARY

In general, it is known that, if the vibration level by resonance in a target of vibration control is reduced using a dynamic vibration absorber, antiresonance occurs in both lower and higher frequency regions of a dynamic vibration absorber than the resonance frequency thereof. Therefore, just like Japanese Unexamined Patent Publication No. 2015-151877, using two dynamic vibration absorbers can reduce two vibration levels by two types of resonance generated in the engine, though using such absorbers causes antiresonance to occur in the lower and higher frequency regions of each of the dynamic vibration absorbers than the resonance frequency of each of the dynamic vibration absorbers.

In general, each antiresonance vibration level is too low to pose any problem. However, depending on the engine design, the antiresonance may interact with another antiresonance, thereby increasing the vibration levels. Accordingly, providing two dynamic vibration absorbers in view of the above interaction can effectively reduce noise generated during the operation of the engine.

The technique disclosed in this specification relates to an engine reciprocative rotation mechanism in which a piston or a connecting rod is provided with first and second dynamic vibration absorbers, and attempts to reduce effectively reduce noise generated during the operation of the engine.

To achieve the above problem, the technique disclosed in this specification is directed to an engine reciprocative rotation mechanism. The engine reciprocative rotation mechanism includes: a piston reciprocating in a cylinder; a connecting rod connecting the piston and a crankshaft together; a first dynamic vibration absorber provided to the piston or the connecting rod, and configured to reduce a vibration level, which is generated during an operation of the engine, at a first resonance frequency; and a second dynamic vibration absorber provided to the piston or the connecting rod, and configured to reduce a vibration level, which is generated during the operation of the engine, at a second resonance frequency higher than the first resonance frequency, wherein the second dynamic vibration absorber is higher in resonance frequency than the first dynamic vibration absorber, and at least one of the resonance frequency of the first dynamic vibration absorber or the resonance frequency of the second dynamic vibration absorber is shifted from associated at least one of the first resonance frequency or the second resonance frequency such that a peak frequency of antiresonance occurring in a higher frequency region of the first dynamic vibration absorber than the resonance frequency of the first dynamic vibration absorber is substantially different from that of antiresonance occurring in a lower frequency region of the second dynamic vibration absorber than the resonance frequency of the second dynamic vibration absorber.

According to the configuration, the first and second dynamic vibration absorbers can reduce vibration levels, which are generated during the operation of the engine, at the first and second resonance frequencies. Further, the peak frequency of antiresonance occurring in a higher frequency region of the first dynamic vibration absorber than the resonance frequency of the first dynamic vibration absorber is substantially different from that of antiresonance occurring in a lower frequency region of the second dynamic vibration absorber than the resonance frequency of the second dynamic vibration absorber. This can reduce an increase in the vibration levels due to the interaction of the two types of antiresonance with each other. In this way, noise generated during the operation of the engine can be reduced, effectively.

The engine reciprocative rotation mechanism may further include a piston pin connecting the piston and the crankshaft together, and having a through hole. The first and second dynamic vibration absorbers may be disposed in the through hole of the piston pin.

According to the configuration, the first and second dynamic vibration absorbers are disposed in the through hole of the piston pin. This allows for integrating the piston, the piston pin, and the small end of the connecting rod together, thereby properly reducing a vibration level by resonance of them with respect to the large end of the connecting rod.

In the engine reciprocative rotation mechanism, at least one of the resonance frequency of the first dynamic vibration absorber or the resonance frequency of the second dynamic vibration absorber may be shifted from associated at least one of the first resonance frequency or the second resonance frequency such that the peak frequency of antiresonance occurring in the higher frequency region of the first dynamic vibration absorber than the resonance frequency of the first dynamic vibration absorber is higher than that of antiresonance occurring in the lower frequency region of the second dynamic vibration absorber than the resonance frequency of the second dynamic vibration absorber According to the configuration, the peak frequency of the antiresonance occurring in the higher frequency region of the first dynamic vibration absorber than the resonance frequency of the first dynamic vibration absorber is higher than that of the antiresonance occurring in the lower frequency region of the second dynamic vibration absorber than the resonance frequency of the second dynamic vibration absorber. Thus, the vibration of the second dynamic vibration absorber can reduce the vibration level by the former antiresonance, and the vibration of the first dynamic vibration absorber can reduce the vibration level by the latter antiresonance. This can effectively reduce noise generated due to the interaction of two types of antiresonance with each other.

The engine reciprocative rotation mechanism including the piston pin may further include a fixture fixing the first and second dynamic vibration absorbers to the piston pin and common to the first and second dynamic vibration absorbers, a first connecter elastically connecting the fixture and the first dynamic vibration absorber together, and a second connecter elastically connecting the fixture and the second dynamic vibration absorber together.

This configuration allows for effectively reducing noise generated during the operation of the engine with a reduced number of components and reduced manufacturing costs.

The technique disclosed in this specification is also directed to a method for manufacturing the engine reciprocative rotation mechanism. Specifically, the technique is directed to the method for manufacturing the engine reciprocative rotation mechanism including a piston reciprocating in a cylinder; a connecting rod connecting the piston and a crankshaft together; a first dynamic vibration absorber provided to the piston or the connecting rod, and configured to reduce a vibration level, which is generated during an operation of the engine, at a first resonance frequency; and a second dynamic vibration absorber provided to the piston or the connecting rod, and configured to reduce a vibration level, which is generated during the operation of the engine, at a second resonance frequency, the second dynamic vibration absorber being higher in resonance frequency than the first dynamic vibration absorber, the method comprising a preparing step of preparing the first and second dynamic vibration absorbers, the preparing step including a shifting step of shifting at least one of the resonance frequency of the first dynamic vibration absorber or the resonance frequency of the second dynamic vibration absorber from associated at least one of the first resonance frequency or the second resonance frequency when a peak frequency of antiresonance occurring in a higher frequency region of the first dynamic vibration absorber than the resonance frequency of the first dynamic vibration absorber is substantially consistent with that of antiresonance occurring in a lower frequency region of the second dynamic vibration absorber than the resonance frequency of the second dynamic vibration absorber.

According to the configuration, the first and second dynamic vibration absorbers can reduce vibration levels, which are generated during the operation of the engine, at the first and second resonance frequencies. Further, at least one of the resonance frequency of the first dynamic vibration absorber or the resonance frequency of the second dynamic vibration absorber is shifted from associated at least one of the first resonance frequency or the second resonance frequency, thereby allowing the peak frequency of antiresonance occurring in a higher frequency region of the first dynamic vibration absorber than the resonance frequency of the first dynamic vibration absorber to be substantially different from that of antiresonance occurring in a lower frequency region of the second dynamic vibration absorber than the resonance frequency of the second dynamic vibration absorber. This can reduce an increase in the vibration levels due to the interaction of the two types of antiresonance with each other. In this way, noise generated during the operation of the engine can be reduced, effectively.

In the method for manufacturing the engine reciprocative rotation mechanism, the shifting step from the associated one of the first resonance frequency or the second resonance frequency may be a step of shifting at least one of the resonance frequency of the first dynamic vibration absorber or the resonance frequency of the second dynamic vibration absorber from associated at least one of the first resonance frequency or the second resonance frequency to associated at least one of the higher frequency region or the lower frequency region.

According to this configuration, at least one of the resonance frequency of the first dynamic vibration absorber or the resonance frequency of the second dynamic vibration absorber is shifted from associated at least one of the first resonance frequency or the second resonance frequency to a higher or lower frequency region, thereby allowing the peak frequency of antiresonance occurring in a higher frequency region of the first dynamic vibration absorber than the resonance frequency of the first dynamic vibration absorber to be higher than that of antiresonance occurring in a lower frequency region of the second dynamic vibration absorber than the resonance frequency of the second dynamic vibration absorber. Thus, the vibration of the second dynamic vibration absorber can reduce the vibration level by the former antiresonance, and the vibration of the first dynamic vibration absorber can reduce the vibration level by the latter antiresonance. This can effectively reduce noise generated due to the interaction of two types of antiresonance with each other.

In the method for manufacturing the engine reciprocative rotation mechanism, the first and second dynamic vibration absorbers may each have a body, a fixture fixed to the piston or the piston pin, and a connecter elastically connecting the body and the fixture together, and the preparing step may further include a changing step of changing at least one of a ratio of a mass of the body of the first dynamic vibration absorber to a reciprocating inertial mass of the reciprocative rotation mechanism or a ratio of a mass of the body of the second dynamic vibration absorber to the reciprocating inertial mass of the reciprocative rotation mechanism, thereby changing associated at least one of an interval of two types of antiresonance occurring in the first dynamic vibration absorber or an interval of two types of antiresonance occurring in the second dynamic vibration absorber.

According to the configuration, in addition to the shift of the resonance frequencies of the first and second dynamic vibration absorbers, at least one of the antiresonance interval in the first dynamic vibration absorber or the antiresonance interval in the second dynamic vibration absorber is changed, thereby allowing the peak frequency of antiresonance occurring in the higher frequency region of the first dynamic vibration absorber than the resonance frequency of the first dynamic vibration absorber to be substantially different from that of the antiresonance occurring in the lower frequency region of the second dynamic vibration absorber than the resonance frequency of the second dynamic vibration absorber. As can be seen, the shift amounts of the resonance frequencies of the first and second dynamic vibration absorbers can be reduced, thereby reliably reducing noise due to the interaction of the two types of antiresonance with each other while reliably reducing the vibration levels at the first and second noise frequencies. Further, this can more freely design the first and second dynamic vibration absorbers to effectively reduce noise generated during the operation of the engine.

DETAILED DESCRIPTION

Exemplary embodiments will now be described with reference to the drawings.

First Embodiment

[Configuration of Engine]

Figure 1:
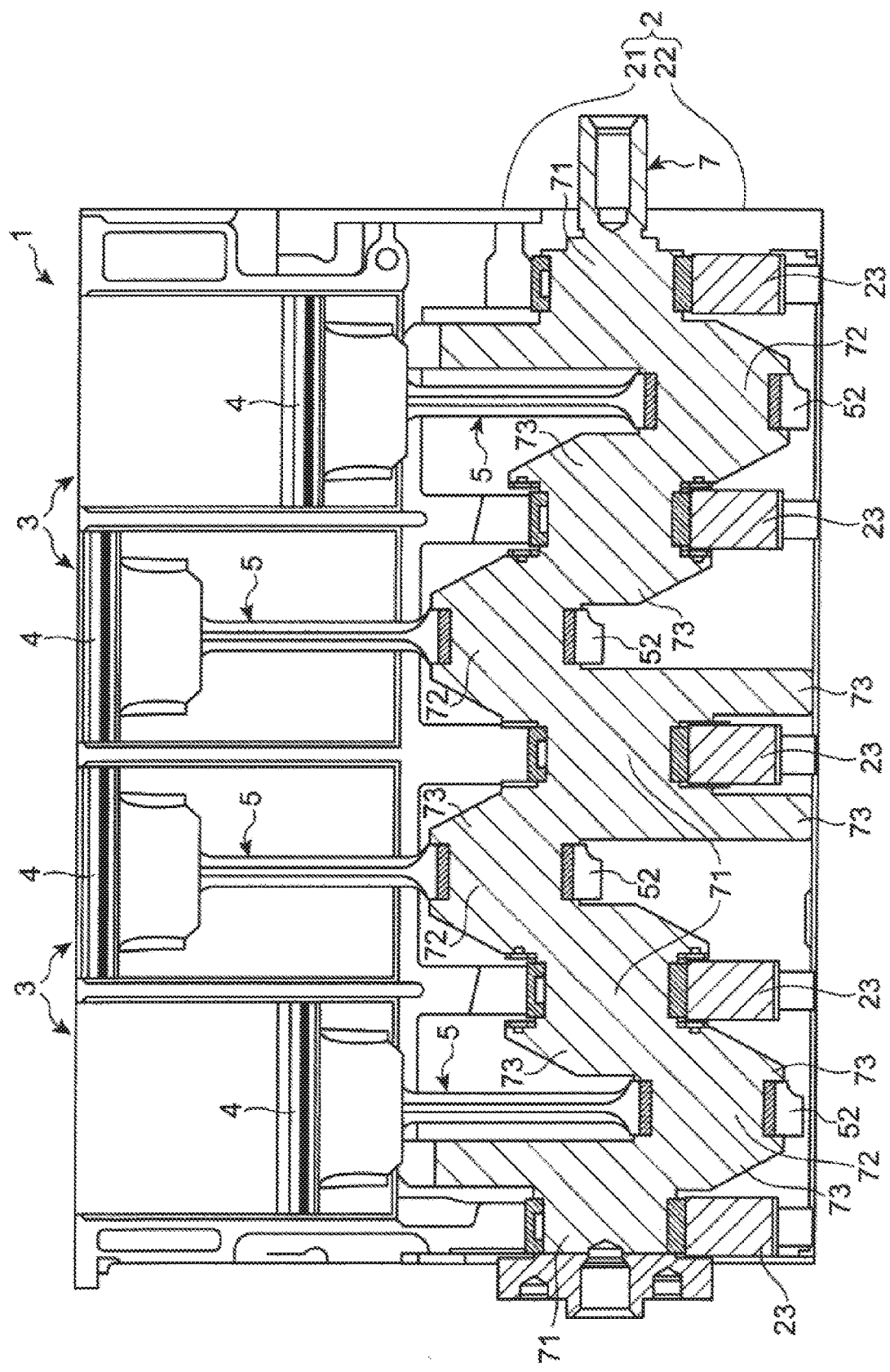
FIG. 1 is a cross-sectional view of an engine including a reciprocative rotation mechanism according to a first embodiment.

FIG. 1 is a cross-sectional view of a multi-cylinder engine 1 including a reciprocative rotation mechanism according to a first embodiment. The engine 1 is mounted in a vehicle such as a motor vehicle. The engine 1 is a compression self-ignition engine, but is not limited thereto. The engine 1 includes a cylinder block 2. The cylinder block 2 includes an upper block 21 and a lower block 22 attached to the lower surface of the upper block 21. The four cylinders 3 are arranged in a line in an upper part of the upper block 21 with a wall interposed between adjacent ones of the cylinders 3. That is to say, the engine 1 is an inline-four engine. Each cylinder 3 is provided with a piston 4 and a connecting rod 5.

The piston 4 slides on, and reciprocates on, the inner peripheral surface of the cylinder 3 in a vertical direction of the vehicle (hereinafter referred to as "the vertical direction" or "vertically") to repeat a cycle comprised of an intake stroke, a compression stroke, a combustion stroke, and an exhaust stroke.

Figure 2:
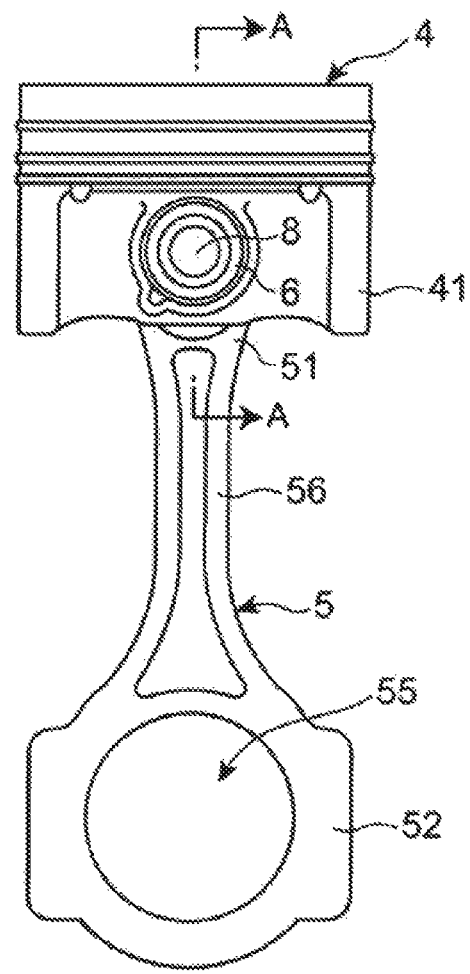
FIG. 2 illustrates the reciprocative rotation mechanism according to the first embodiment.
Figure 3:
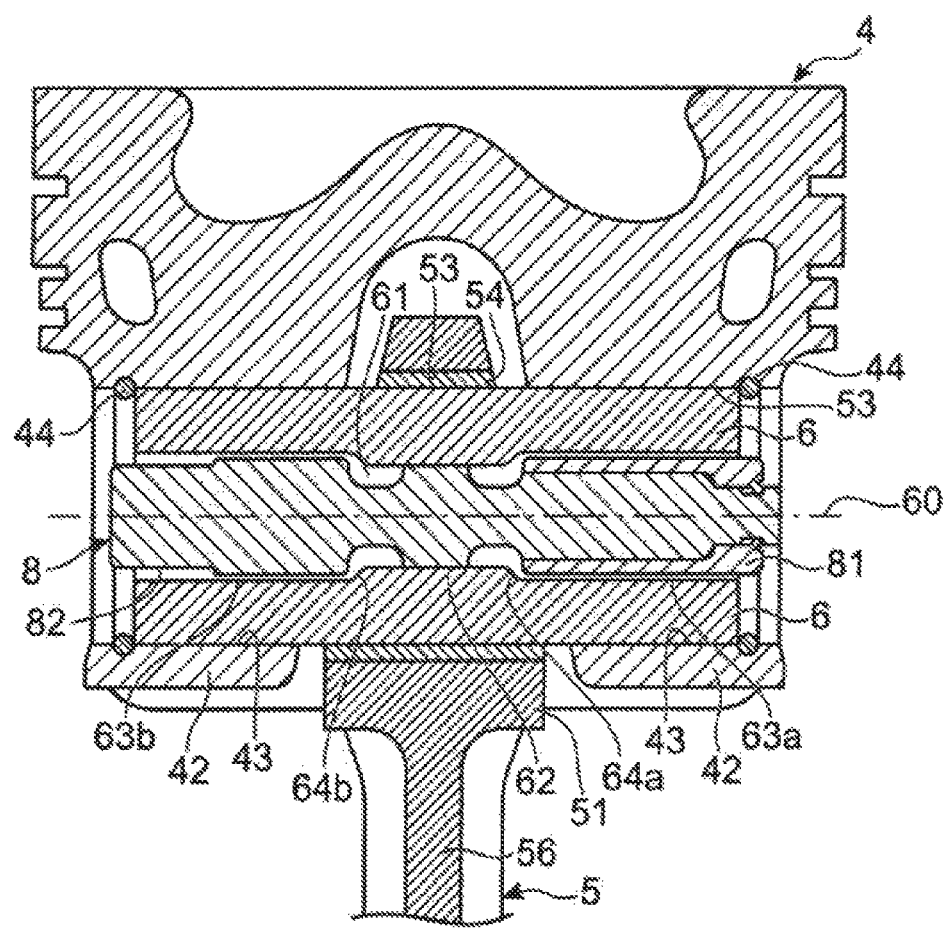
FIG. 3 is a cross-sectional view taken along line A-A of FIG. 2.

As illustrated in FIGS. 2 and 3, the connecting rod 5 includes a small end 51 and a large end 52. The small end 51 is provided with a pin through hole 53. A bush 54 is fixed to the inner peripheral surface of the pin through hole 53. A piston pin 6 is inserted into the pin through hole 53, i.e., the inner peripheral surface of the bush 54. A gap between the inner peripheral surface of the pin through hole 53 and the piston pin 6 is supplied with lubricant circulating in the engine 1, thereby forming a lubricant film. This lubricant film and the bush 54 allow the piston pin 6 to smoothly rotate with respect to the pin through hole 53. The piston pin 6 is fitted into a pin supporting hole 43 of a boss 42 provided to a piston skirt 41 of the piston 4. As a result, the connecting rod 5 is connected to the piston 4 through the piston pin 6. The lubricant circulating in the engine 1 is also supplied to a gap between the inner peripheral surface of the boss 42 and the piston pin 6, thereby forming a lubricant film. This allows the piston pin 6 to smoothly rotate with respect to the inner peripheral surface of the boss 42. A snap ring 44 is fitted into the boss 42 to restrict the axial movement of the piston pin 6.

The piston pin 6 has a central axis 60. The direction in which the central axis 60 extends is referred to as the central axis direction of the piston pin 6. The central axis direction of the piston pin 6 is consistent with the longitudinal direction of the piston pin 6. The central axis direction of the piston pin 6 is consistent with a perpendicular to the paper of FIG. 2, and the lateral direction of the paper of FIG. 3. The direction orthogonal to the central axis direction of the piston pin 6 is referred to as a radial direction of the piston pin 6.

The large end 52 of the connecting rod 5 is provided with a shaft through hole 55. A crankshaft 7 shown in FIG. 1 is inserted into the shaft through hole 55. As a result, the connecting rod 5 is connected to the crankshaft 7. In this way, the connecting rod 5 connects the piston 4 and the crankshaft 7 together. The small end 51 of the connecting rod 5 is connected to the large end 52 of the connecting rod 6 through a connecter 56.

In the first embodiment, a full floating piston pin is used as the piston pin 6. There is a gap between the connecting rod 5 and the piston pin 6. This allows the piston pin 6 to rotate with respect to the pin through hole 53 of the connecting rod 5 and the pin supporting hole 43 of the boss 42 of the piston 4.

The piston pin 6 is provided with a through hole 61 having a circular cross section and extending in the central axis direction of the piston pin 6. In the inner peripheral surface of the piston pin 6, the central portion in the central axis direction is a portion having an inner peripheral surface which a damping member 8 that will be described later is press-fitted into and fixed to, and is referred to as a press-fitted portion 62. Both end portions of the press-fitted portion 62 in the central axis direction of the piston pin 6 are referred to as housing portions 63a and 63b. The diameter of a portion of the through hole 61 associated with the press-fitted portion 62 is smaller than that of a portion of the through hole 61 associated with the housing portions 63a and 63b. A space between the press-fitted portion 62 and the housing portion 63a and a space between the press-fitted portion 62 and the housing portion 63b are respectively provided with steps 64a and 64b.

Referring back to FIG. 1, the crankshaft 7 has a crank journal 71, a crank pin 72, and a crank arm 73. The crank journal 71 is rotatably supported by the lower block 22 and a main bearing cap 23. The crank pin 72 is rotatably connected to the large end 52 of the connecting rod 5. The crank pins 72 are connected together through the piston 4 and the connecting rod 5. The crank arm 73 connects an end of the crank journal 71 to an end of the crank pin 72 closer to the end of the crank journal 71. As a result, in the crankshaft 7, the crank journal 71, the crank pin 72, and the crank arm 73 rotate collectively.

[Configuration of Damping Member]

As described above, the damping member 8 is disposed in the through hole 61 of the piston pin 6. The damping member 8 has a central axis such that the central axis of the damping member 8 and the central axis 60 of the piston pin 6 are (or substantially) on the same line. The central axis direction of the damping member 8 is consistent with the longitudinal direction of the damping member 8. The damping member 8 may be a solid member. The damping member 8 includes two dynamic vibration absorbers 81 and 82 having different resonance frequencies (in other words, frequencies associated with a natural resonant frequency). Hereinafter, the dynamic vibration absorber 81 is referred to as a first dynamic vibration absorber, and the dynamic vibration absorber 82 is referred to as a second dynamic vibration absorber. The damping member 8 is operable so as to allow the two dynamic vibration absorbers 81 and 82 to reduce vibration levels by two types of resonance occurring in a target of vibration control.

Figure 4:
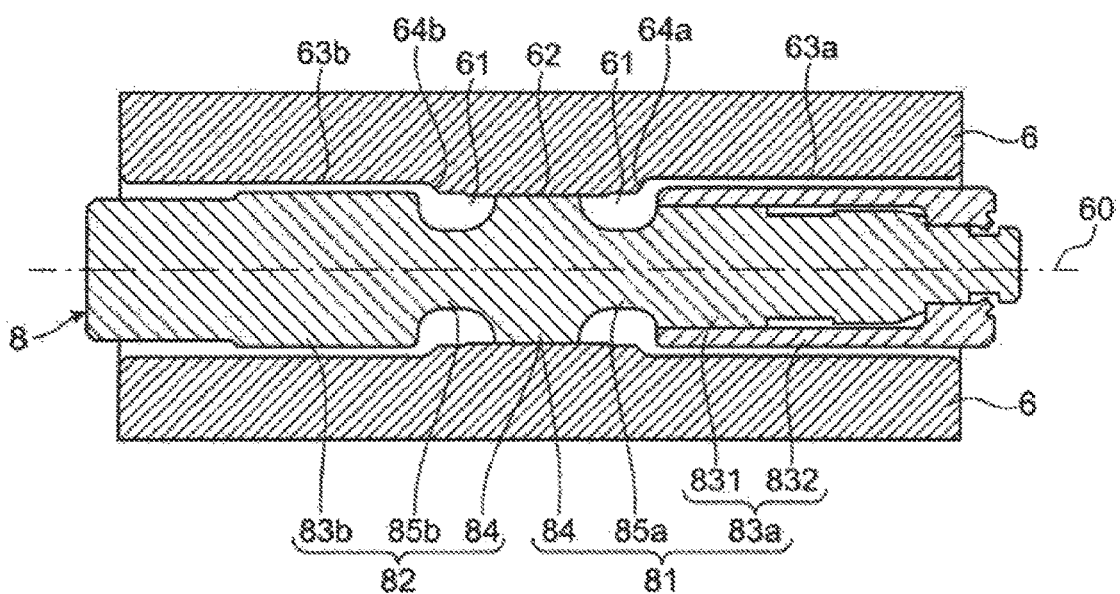
FIG. 4 is an enlarged cross-sectional view of a main part of FIG. 3.

As shown in FIG. 4, the damping member 8 includes bodies 83a and 83b, a fixture 84, and arms 85a and 85b. The damping member 8 may be made of metal. The first dynamic vibration absorber 81 includes the body 83a, the fixture 84, and the arm 85a, and the second dynamic vibration absorber 82 includes the body 83b, the fixture 84, and the arm 85b. That is to say, the first dynamic vibration absorber 81 and the second dynamic vibration absorber 82 share the fixture 84, and are integrated with each other by the fixture 84.

In the first embodiment, the body 83b, the fixture 84, and the arm 85b constituting the second dynamic vibration absorber 82 are comprised of one single member. In contrast, the body 83a forming the first dynamic vibration absorber 81 are comprised of two members (a shaft 831 and a cap 832), which are assembled together.

The bodies 83a and 83b are provided to both ends of the damping member 8 in the central axis direction of the piston pin 6. The bodies 83a and 83b are substantially column-shaped, and the central axes of the bodies 83a and 83b are consistent with the central axis of the damping member 8. The bodies 83a and 83b are disposed so as to be respectively associated with the housing portions 63a and 63b in the through hole 61 of the piston pin 6. The center of mass of each of the bodies 83a and 83b is positioned on the central axis 60 of the piston pin 6. The bodies 83a and 83b are portions where the mass of the damping member 8 is concentrated. The bodies 83a and 83b, along with vertical movement of the piston 4, substantially simply vibrate in the vertical direction.

The outer diameters of the bodies 83a and 83b are respectively smaller than the inner diameters of the housing portions 63a and 63b and are respectively larger than the inner diameter of the press-fitted portion 62 such that the bodies 83a and 83b do not come into contact with the inner peripheral surfaces of the housing portions 63a and 63b in a situation where the bodies 83a and 83b vibrate. This allows the steps 64a and 64b to restrict movement of the bodies 83a and 83b in the central axis direction of the piston pin 6.

The fixture 84 is positioned at the middle portion of the damping member 8 in the central axis direction of the piston pin 6. The fixture 84 is substantially column-shaped, and the central axis of the fixture 84 is consistent with the central axis of the damping member 8. The fixture 84 is press-fitted into, and fixed to, the press-fitted portion 62 of the piston pin 6, and may be referred to a press-fitting portion. The outer diameter of the fixture 84 is smaller than the outer diameter of each of the bodies 83a and 83b, and is larger than the inner diameter of the press-fitted portion 62.

The arms 85a and 85b connect the bodies 83a and 83b and the fixture 84 together, supporting the bodies 83a and 83b with respect to the fixture 84. The arms 85a and 85b are disposed in the central axis direction of the piston pin 6 in a region ranging from the press-fitted portion 62 to the housing portions 63a and 63b. The arms 85a and 85b are substantially column-shaped, and the central axis of each of the arms 85a and 85b is consistent with the central axis of the damping member 8.

The outer diameters of the arms 85a and 85b are smaller than the outer diameter of the fixture 84, the outer diameters of the bodies 83a and 83b, and the inner diameter of the press-fitted portion 62. This can insert the arms 85a and 85b into the press-fitted portion 62. The equivalent diameters of the arms 85a and 85b (the outer diameters if the arms 85a and 85b are substantially column-shaped) are sufficiently smaller than the outer diameters of the bodies 83a and 83b. Therefore, when the bodies 83a and 83b both vertically vibrate, the arms 85a and 85b can be considered as a spring having a predetermined spring constant for the vibration. The equivalent diameters of the arms 85a and 85b are preferably large enough to have stiffness resistant to vibration for a long time. For example, the arms 85a and 85b may have the completely (or substantially) same diameter large enough to have stiffness resistant to vibration for a long time. At that time, the resonance frequencies of the first and second dynamic vibration absorbers 81 and 82 will be adjusted according to the masses of the bodies 83a and 83b. The resonance frequencies of the first and second dynamic vibration absorbers 81 and 82 will be described later.

As described above, the body 83a of the first dynamic vibration absorber 81 includes the shaft 831 and the cap 832. The shaft 831 is integrally formed with the fixture 84 and the arm 85a. The shaft 831 has a central axis consistent with the central axis of the damping member 8. The shaft 831 has an outer diameter smaller than the inner diameter of the press-fitted portion 62. This can insert the shaft 831 into the press-fitted portion 62. The cap 832 is press-fitted into, and assembled to, the outer peripheral surface of the shaft 831. Using the cap 832 allows for easily controlling the mass of the body 83a.

[Design for First and Second Dynamic Vibration Absorbers]

With reference to FIGS. 5 to 8, it will be described how the first and second dynamic vibration absorbers 81 and 82 according to the first embodiment are designed.

Figure 5:
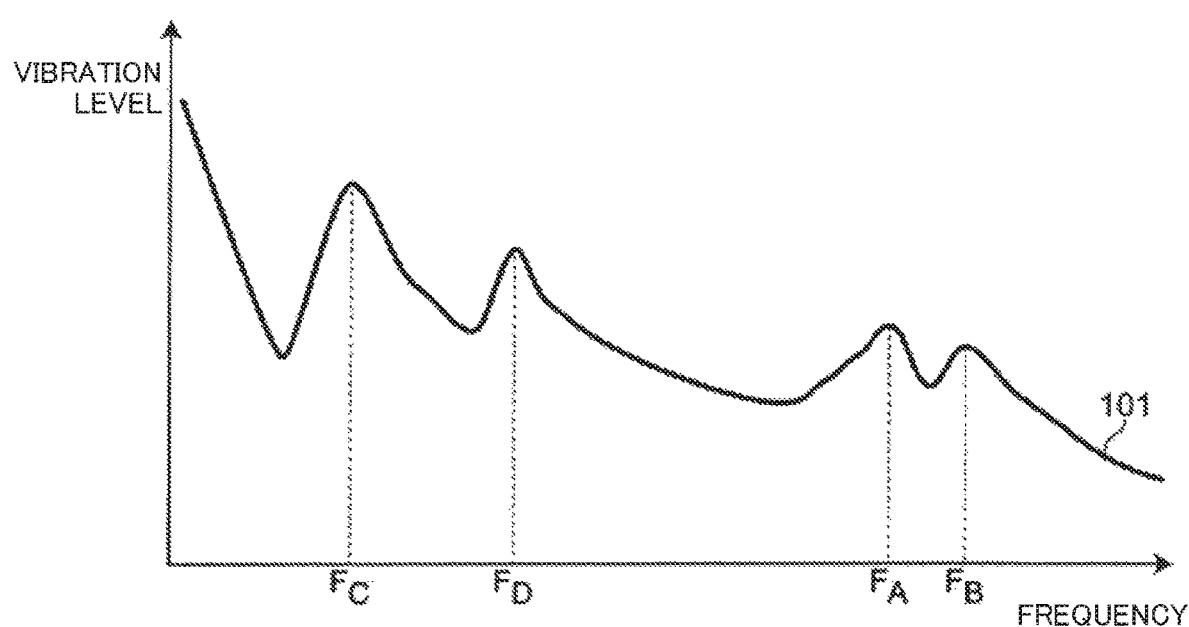
FIG. 5 is a graph showing engine vibration characteristics.

FIG. 5 is a graph showing vibration characteristics 101 of the engine 1. In this graph, the horizontal axis represents a frequency, and the vertical axis represents a vibration level (sound pressure). In FIG. 5, resonance occurring at four types of frequencies (FA, FB, FC, and FD) can be observed. The resonance frequencies FA and FB in a high frequency region are close to each other. The resonance frequencies FA and FB in the high frequency region are sufficiently apart from the resonance frequencies FC and FD in a low frequency region.

Figure 6:
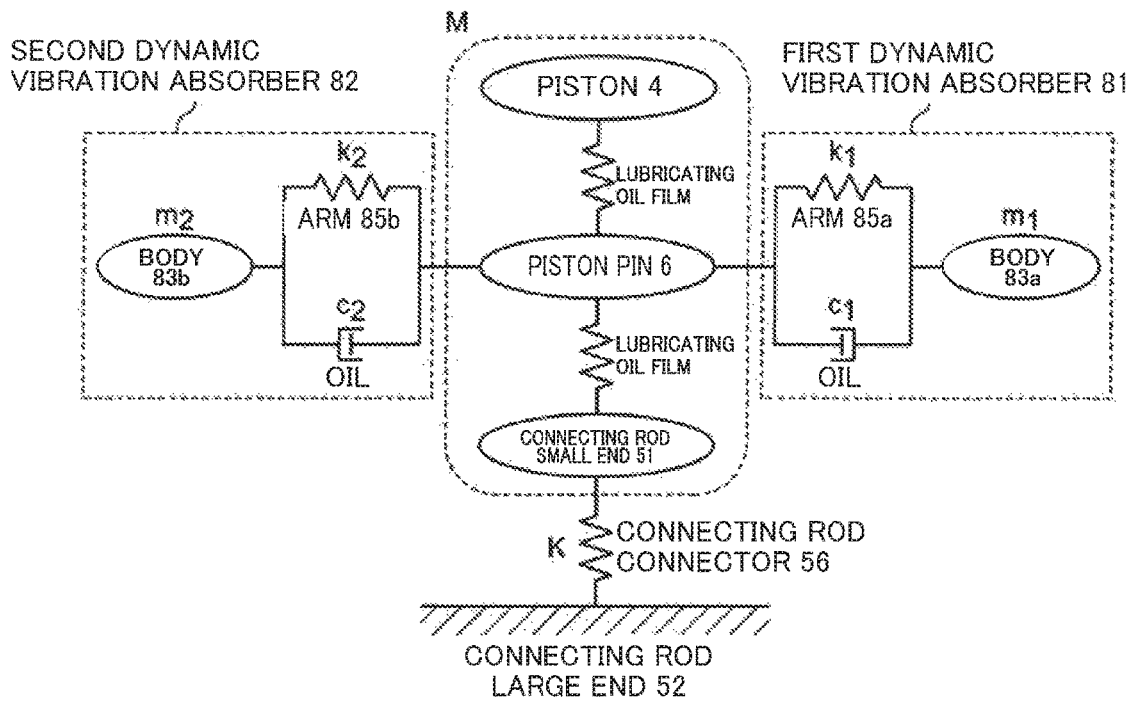
FIG. 6 shows a spring mass model equivalent to the engine reciprocative rotation mechanism.

FIG. 6 shows a spring mass model equivalent to the engine reciprocative rotation mechanism 1. The piston 4, the piston pin 6, and the small end 51 of the connecting rod 5 that are a target of vibration control collectively correspond to a material particle (that is supposed to have a mass M). The connecter 56 of the connecting rod 5 corresponds to a spring that supports the material particle with respect to the large end 52 of the connecting rod 5 (and that is supposed to have a spring constant of K). The body 83a of the first dynamic vibration absorber 81 is supposed to have a mass m1, and the body 83b of the second dynamic vibration absorber 82 is supposed to have a mass m2. The arms 85a and 85b of the first and second dynamic vibration absorbers 81 and 82 correspond to springs supporting the bodies 83a and 83b with respect to the piston pin 6. The springs are supposed to have spring constants k1 and k2. Compared to the mass of each of the bodies 83a and 83b, the mass of each of the arms 85a and 85b is so small as to be negligible.

In some cases, engine oil enters the through hole 61 of the piston pin 6. If oil is interposed between the piston pin 6 and the damping member 8, the resonance frequencies of the first and second dynamic vibration absorbers 81 and 82 vary. Thus, in the first embodiment, oil is always supposed to the through hole 61 of the piston pin 6. The oil supplied to the housing portion 63a of the through hole 61 of the piston pin 6 serves as a damper c1 between the piston pin 6 and the body 83a, and the oil supplied to the housing portion 63b of the through hole 61 of the piston pin 6 serves as a damper c2 between the piston pin 6 and the body 83b.

As described above, a first lubricant film is formed between the piston pin 6 and the pin through hole 53 of the connecting rod 5, and a second lubricant film is formed between the piston pin 6 and the pin supporting hole 43 of the boss 42 of the piston 4. The first lubricant film corresponds to a spring coupling the piston pin 6 to the small end 51 of the connecting rod 5, and the second lubricant film corresponds to a spring coupling the piston pin 6 to the boss 42 of the piston 4. In the combustion stroke of the engine 1, the piston 4 is pressed with a large force, and thus, the first and second lubricant films disappear. Accordingly, in the combustion stroke of the engine 1, the piston 4, the piston pin 6, and the small end 51 of the connecting rod 5 collectively resonate with respect to the large end 52 of the connecting rod 5 at a resonant frequency of $(1/2\pi)\cdot\sqrt{(K/M)}$. This resonance frequency corresponds to the resonance frequency FA in FIG. 5.

Next, resonance at the frequencies FC and FD in the low frequency region occurs because of providing the first and second dynamic vibration absorbers 81 and 82. Specifically, the resonance occurs because resonance in, e.g., the crankshaft 7 and/or the cylinder block 2 becomes large during the operation of the engine 1 in a situation where the first dynamic vibration absorber 81 or the second dynamic vibration absorber 82 is utilized to reduce the resonance vibration level at a frequency FA.

Next, the resonance frequency FB which is close to the resonance frequency FA by resonance in, e.g., the piston 4 is caused due to the resonance in the lower block 22, and its vibration is excited by transmission of an exciting force by the piston 4, the connecting rod 5, the crankshaft 7, and the main bearing cap 23.

A large vibration level at the resonance frequencies FA and FB in the high frequency region may make an occupant feel unnatural. Hereinafter, the resonance frequencies FA and FB are respectively referred to as a first and second noise frequencies (or first and second resonance frequencies). The second noise frequency (second resonance frequency) FB is higher than the first noise frequency (first resonance frequency) FA. In the first embodiment, an appropriate design of the first and second dynamic vibration absorbers 81 and 82 for reducing the vibration levels at the first and second noise frequencies FA and FB will be considered. In order to reduce the vibration levels at the resonance frequencies FC and FD in the low frequency region, another dynamic vibration absorber may be provided.

In the first embodiment, the first dynamic vibration absorber 81 is designed so as to reduce the vibration level in a situation where the piston 4, the piston pin 6, and the small end 51 of the connecting rod 5 collectively resonate with respect to the large end 52 of the connecting rod 5 in the combustion stroke. The second dynamic vibration absorber 82 is designed so as to reduce the vibration level by the resonance in the lower block 22 caused by the vibration in the main bearing cap 23. In other words, in the first embodiment, in the spring mass model shown in FIG. 6, a resonance frequency f1 $(=(1/2\pi)\cdot\sqrt{(k1/m1)})$ of the first dynamic vibration absorber 81 is adapted to the first noise frequency FA, and a resonance frequency f2 $(=(1/2\pi)\cdot\sqrt{(k2/m2)})$ of the second dynamic vibration absorber 82 is adapted to the second noise frequency FB. Accordingly, the resonance frequency f2 of the second dynamic vibration absorber 82 is higher than the resonance frequency f1 of the first dynamic vibration absorber 81.

The resonance frequencies f1 and f2 of the first and second dynamic vibration absorbers 81 and 82 can be set to a desired value by changing at least one of the masses m1 and m2 of the bodies 83a and 83b or the spring constants k1 and k2 of the arms 85a and 85b (the springs). In order to increase the masses m1 and m2 of the bodies 83a and 83b without increasing the outer dimensions of the bodies 83a and 83b, the bodies 83a and 83b may be comprised of a material having a larger density. The spring constants k1 and k2 of the arms 85a and 85b of the first and second dynamic vibration absorbers 81 and 82 are adjusted by changing a parameter selected from a group comprising lengths of the arms 85a and 85b, the outer diameters of the arms 85a and 85b, and the materials constituting the arms 85a and 85b, and any combination thereof. For example, it is known that, if the lengths of the arms 85a and 85b are made longer, the outer diameters of the arms 85a and 85b are made smaller, or the materials of the arms 85a and 85b are replaced with materials having lower stiffness, the spring constant is reduced.

In the description of the specification, the state where the resonance frequency of a dynamic vibration absorber is adapted to the resonance frequency of a target of vibration control includes not only a state where both of the resonance frequencies are completely or substantially consistent with each other, but also a state where the resonance frequency of a dynamic vibration absorber is shifted from the resonance frequency of the target of vibration control. The amount of the shift will be described later.

Contrary to the above design, the first dynamic vibration absorber 81 may be designed to reduce the vibration level by resonance (the noise frequency FB) of the lower block 22, and the second dynamic vibration absorber 82 may be designed to reduce the vibration level by resonance (the noise frequency FA) in, e.g., the piston 4.

Here, in general, if the resonance frequency of the dynamic vibration absorber is adapted to the resonance frequency of a target of vibration control, the vibration level of the target of vibration control can be reduced, and antiresonance occurs in both lower and higher frequency regions of the dynamic vibration absorber than the resonance frequency of the dynamic vibration absorber. In the first embodiment, the resonance frequencies f1 and f2 of the first and second dynamic vibration absorbers 81 and 82 are adapted to the first and second noise frequencies FA and FB, antiresonance occurs in both lower and higher frequency regions than each of the resonance frequencies f1 and f2.

Figure 7:
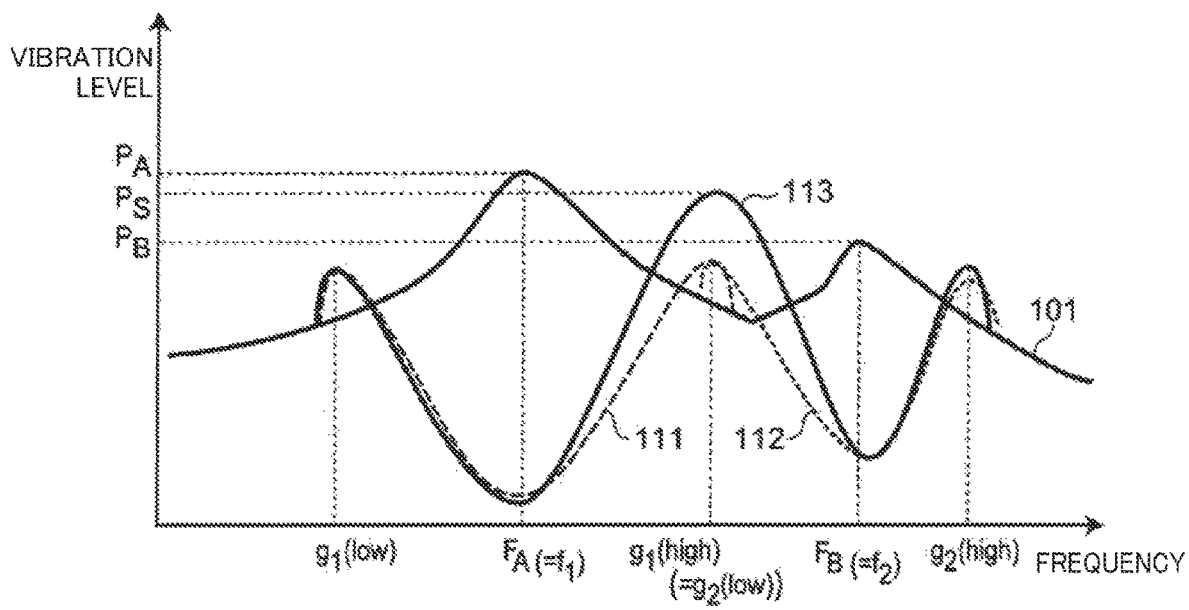
FIG. 7 is a graph showing resonance curves in a situation where first and second dynamic vibration absorbers, which are not properly designed, are added to a main vibration system.
Figure 8:
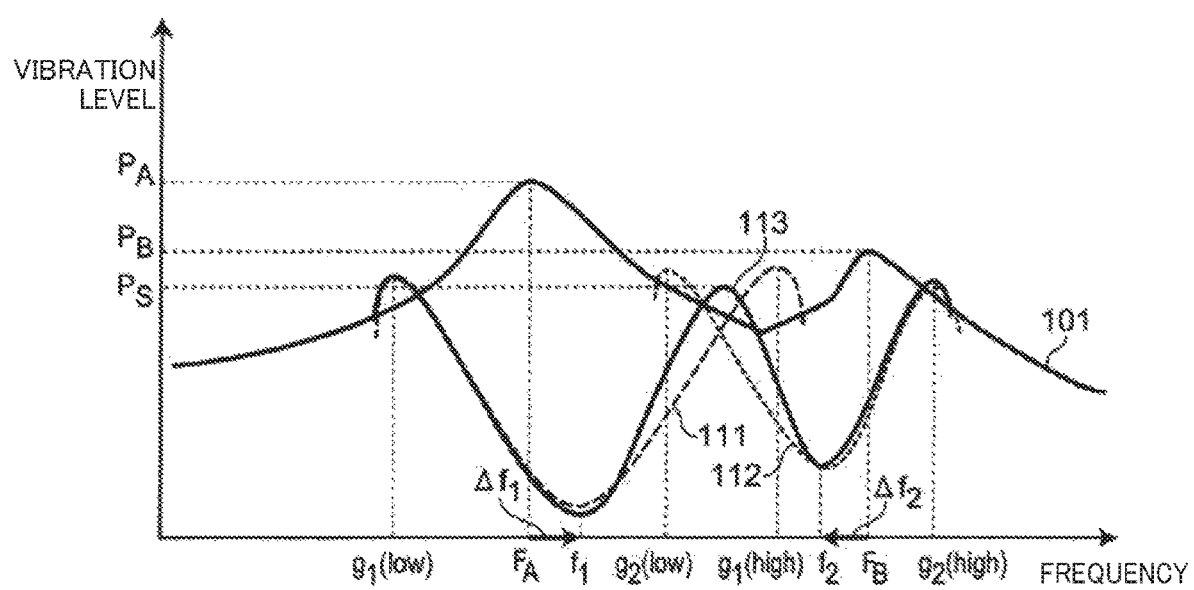
FIG. 8 is a graph corresponding to FIG. 7 and illustrating the design of the first and second dynamic vibration absorbers according to the first embodiment.

FIGS. 7 and 8 are graphs showing resonance curves in a situation where the first and second dynamic vibration absorbers 81 and 82 are added to a main vibration system. The first and second dynamic vibration absorbers 81 and 82 in the example of FIG. 7 are not properly designed, unlike the following description. The first and second dynamic vibration absorbers 81 and 82 in the example of FIG. 8 are properly designed as the following description. In FIGS. 7 and 8, the horizontal axis represents a frequency, and the vertical axis represents a vibration level (or a sound pressure). A reference character 111 denotes the broken line showing the resonance curve of the first dynamic vibration absorber 81, and a reference character 112 denotes the broken line showing the resonance curve of the second dynamic vibration absorber 82. A reference character 113 denotes an actual vibration curve (the solid line) obtained by super-positioning the resonance curves 111 and 112 based on a principle of wave superposition. It is assumed that the vibration levels at the first and second noise frequencies FA and FB are respectively referred to as PA and PB. In addition, the graphs in FIGS. 7 and 8 show vibration characteristics 101 of the engine 1 shown in FIG. 5.

In FIG. 7, the resonance frequencies f1 and f2 of the first and second dynamic vibration absorbers 81 and 82 are respectively adapted to the first and second noise frequencies FA and FB. That is to say, in the example of FIG. 7, the first and second noise frequencies FA and FB are respectively objective frequencies of the first and second dynamic vibration absorbers 81 and 82. The profile of the vibration curve 113 shows that the vibration levels at the first and second noise frequencies FA and FB are significantly reduced.

As described above, antiresonance occurs in both the lower and higher frequency regions of the first dynamic vibration absorber 81 than the resonance frequency f1 of the first dynamic vibration absorber 81. It is supposed that, in the first dynamic vibration absorber 81, a frequency at which the antiresonance in the higher frequency region peaks (peak frequency) is g1 (high), and a frequency at which the antiresonance in the lower frequency region peaks (peak frequency) is g1 (low). Likewise, antiresonance occurs in both the lower and higher frequency regions of the second dynamic vibration absorber 82 than the resonance frequency f2 of the second dynamic vibration absorber 82. It is supposed that, in the second dynamic vibration absorber 82, a frequency at which the antiresonance in the higher frequency region peaks (peak frequency) is g2 (high), and a frequency at which the antiresonance in the lower frequency region peaks (peak frequency) is g2 (low).

Here, typically, the vibration levels of antiresonance occurring in the first and second dynamic vibration absorbers 81 and 82 are sufficiently smaller than the vibration levels PA and PB of the first and second noise frequencies FA and FB. However, as shown in FIG. 7, when the antiresonance peak frequency g1 (high) in the higher frequency region of the first dynamic vibration absorber 81 is completely or substantially consistent with the antiresonance peak frequency g2 (low) in the lower frequency region of the second dynamic vibration absorber 82, a vibration level PS at which the superpositioned antiresonance (the vibration curve 113) peaks may be larger than the vibration level PA at the first noise frequency FA or the vibration level PB at the second noise frequency FB in the original vibration characteristics 101 of the engine 1. This tends to particularly occur when the first and second noise frequencies FA and FB are close to each other. FIG. 7 shows an example in which the vibration level PS at which the superpositioned antiresonance peaks is larger than the vibration level PB at the second noise frequency FB. In this case, a new noise source is generated though the vibration levels PA and PB at the first and second noise frequencies FA and FB are reduced using the first and second dynamic vibration absorbers 81 and 82.

In the first embodiment, when the antiresonance peak frequency g1 (high) in the higher frequency region of the first dynamic vibration absorber 81 is completely or substantially consistent with the antiresonance peak frequency g2 (low) in the lower frequency region of the second dynamic vibration absorber 82, the resonance frequency f1 of the first dynamic vibration absorber 81 is shifted from the first noise frequency FA, and the resonance frequency f2 of the second dynamic vibration absorber 82 is shifted from the second noise frequency FB. This allows the peak frequency g1 (high) and the peak frequency g2 (low) to have different values from each other. Although both the resonance frequency f1 of the first dynamic vibration absorber 81 and the resonance frequency f2 of the second dynamic vibration absorber 82 may be shifted, this is merely an example of the present disclosure. Alternatively, only one of resonance frequency f1 or f2 may be shifted.

At that time, the resonance frequencies f1 and f2 may be brought close to each other (by, for example, shifting the resonance frequency f1 to the higher frequency region and shifting the resonance frequency f2 to the lower frequency region), and conversely, they may be moved away from each other (by, for example, shifting the resonance frequency f1 to the lower frequency region and shifting the resonance frequency f2 to the higher frequency region).

Reducing the masses m1 and m2 of the bodies 83a and 83b can respectively shift the resonance frequencies f1 and f2 to the respective higher frequency regions, whereas increasing the masses m1 and m2 can respectively shift the resonance frequencies f1 and f2 to the respective lower frequency regions. Also, increasing the spring constants k1 and k2 of the arms 85a and 85b can respectively shift the resonance frequencies f1 and f2 to the respective higher frequency regions, whereas reducing the spring constants k1 and k2 of the arms 85a and 85b can respectively shift the resonance frequencies f1 and f2 to the respective lower frequency regions.

In this specification, the state in which the two antiresonance peak frequencies (specifically, g1 (high) and g2 (low)) are substantially different from each other at least means that the two antiresonance peak frequencies are shifted from each other when the vibration level PS at which the superpositioned antiresonance peaks is equal to or below the vibration level PA at the first noise frequency FA and the vibration level PB at the second noise frequency FB in the original vibration characteristics 101 of the engine 1. The state in which the two antiresonance peak frequencies are substantially consistent with each other means that the two frequencies are close to each other when the vibration level PS exceeds the vibration level PA (or PB).

In the example of FIG. 8, the resonance frequency f1 in the first dynamic vibration absorber 81 is shifted to the higher frequency region by Δf1, and the resonance frequency f2 in the second dynamic vibration absorber 82 is shifted to the lower frequency region by Δf2. This allows the peak frequency g1 (high) to be substantially different from the peak frequency g2 (low). As a result, the antiresonance peak frequency g1 (high) in the higher frequency region of the first dynamic vibration absorber 81 is higher than the antiresonance peak frequency g2 (low) in the lower frequency region of the second dynamic vibration absorber 82. FIG. 8 shows that the vibration level PS at which the superpositioned antiresonance peaks is smaller than the vibration levels PA and PB.

As can be seen, the first embodiment allows for reducing the vibration levels at the first and second noise frequencies FA and FB, and reducing an increase in vibration levels due to the interaction of the two types of antiresonance with each other. This can effectively reduce noise generated during the operation of the engine 1.

As described above, in the first embodiment, the resonance frequencies f1 and f2 may be brought close to each other or may be moved away from each other from the original value (the value at which the peak frequencies g1 (high) and g2 (low) are consistent with each other) as a reference such that the peak frequencies g1 (high) and g2 (low) have substantially different values from each other. Preferably, just like the example of FIG. 8, the resonance frequency f1 of the first dynamic vibration absorber 81 is shifted to the higher frequency region, whereas the resonance frequency f2 of the second dynamic vibration absorber 82 is shifted to the lower frequency region, thereby bringing the resonance frequencies f1 and f2 close to each other. As a result, the antiresonance vibration level in the higher frequency region of the first dynamic vibration absorber 81 can be reduced by the vibration in the second dynamic vibration absorber 82, and the antiresonance vibration level in the lower frequency region of the second dynamic vibration absorber 82 can be reduced by the vibration in the first dynamic vibration absorber 81.

In a situation where the resonance frequencies f1 and f2 in the first and second dynamic vibration absorbers 81 and 82 are adjusted not by the spring constants k1 and k2 of the arms 85a and 85b but by the masses m1 and m2 of the bodies 83a and 83b, the body 83a of the first dynamic vibration absorber 81 that is heavier than the body 83b of the second dynamic vibration absorber 82 is needed to be further heavier in order to move the resonance frequencies f1 and f2 away from each other. At that time, it may be difficult to dispose the first dynamic vibration absorber 81 in the through hole 61 of the piston pin 6. However, bringing the resonance frequencies f1 and f2 closer to each other can prevent the mass of the body 83a of the first dynamic vibration absorber 81 from increasing too much.

However, if the shift amount Δf1 and Δf2 are too large, the advantage of reducing the vibration levels PA and PB at the first and second noise frequencies FA and FB by the first and second dynamic vibration absorbers 81 and 82 cannot be obtained, sufficiently. Further, for example, the antiresonance peak frequency g1 (high) may coincide with the second noise frequency FB or the antiresonance peak frequency g2 (low) may coincide with the first noise frequency FA, resulting in generation of a new noise source. Accordingly, the shift amounts Δf1 and Δf2 are set such that the maximum value of the vibration level in the actual vibration curve 113 obtained by the superposition of the resonance curves 111 and 112 is smaller than the vibration levels PA and PB at the first and second noise frequencies FA and FB.

[Method of Fabricating Engine Reciprocative Rotation Mechanism]

Figure 9:
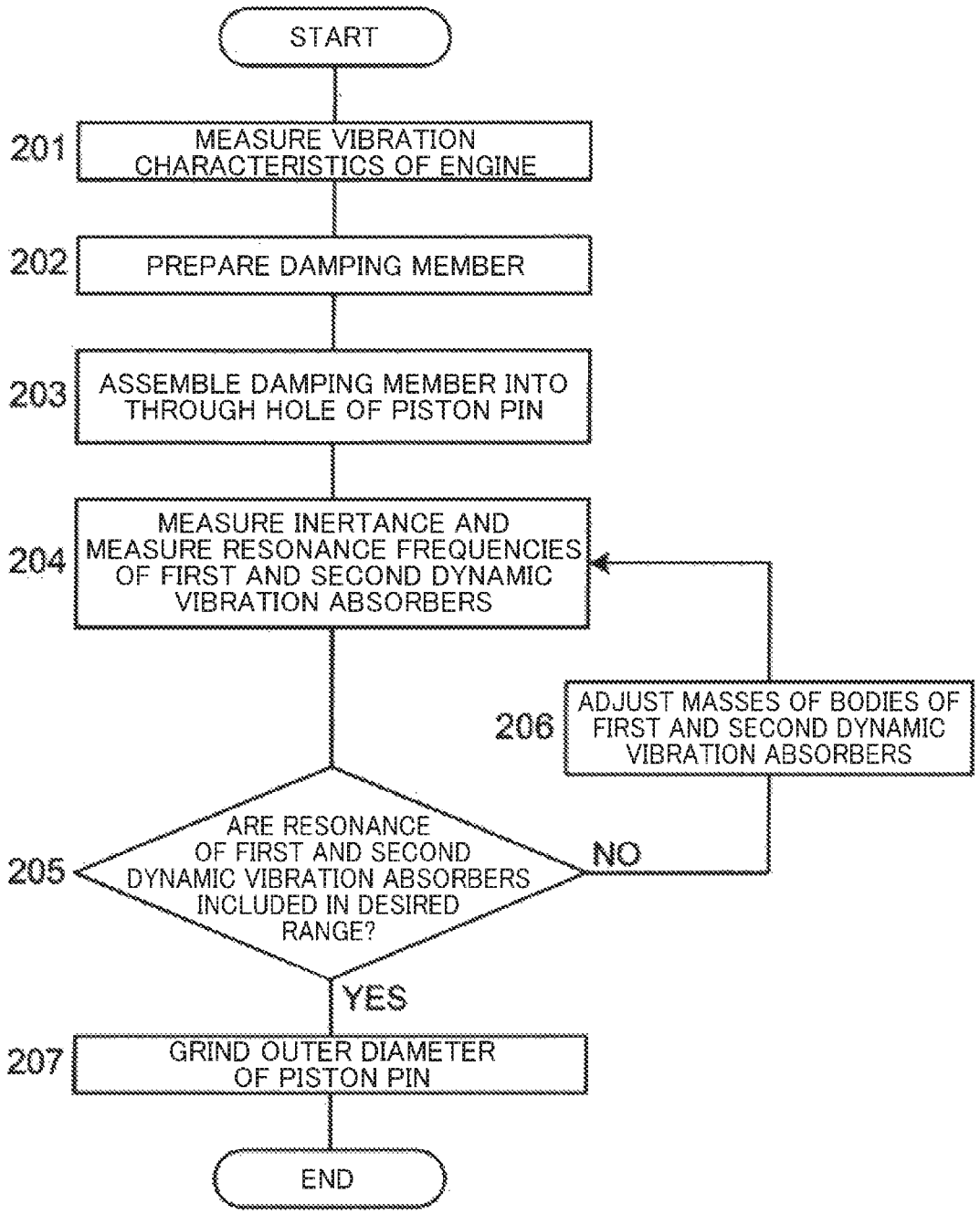
FIG. 9 is a flowchart showing an exemplary method for manufacturing the engine reciprocative rotation mechanism.

FIG. 9 is a flowchart showing an exemplary method for manufacturing the reciprocative rotation mechanism of the engine 1. This method includes Steps 201 to 207.

In Step 201, the vibration characteristics 101 (for example, the reference character 101 of FIG. 5) of the engine 1 are measured. The vibration characteristics measured at Step 201 are supposed to have the first and second noise frequencies FA and FB close to each other and shown in FIG. 5.

At Step 202, the damping member 8 including the first and second dynamic vibration absorbers 81 and 82 are prepared. Specifically, according to the design described with reference to FIGS. 5 to 8, the masses m1 and m2 of the bodies 83a and 83b of the damping member 8 and the spring constants k1 and k2 of the arms 85a and 85b are adjusted to obtain desired values of the resonance frequencies f1 and f2 of the first and second dynamic vibration absorbers 81 and 82.

At Step 203, the damping member 8 is assembled into the through hole 61 of the piston pin 6. In the damping member 8, the bodies 83a and 83b having a larger diameter cannot be inserted into the press-fitted portion 62 having a smaller diameter. Hence, first, the damping member 8 in a state where the cap 832 of the first dynamic vibration absorber 81 is not assembled to the shaft 831 is inserted into the through hole 61 from a side closer to the first dynamic vibration absorber 81. Next, the fixture 84 is press-fitted into the press-fitted portion 62, thereby fixing the damping member 8 to the piston pin 6. Then, the cap 832 is press-fitted into the shaft 831 to completely assemble the damping member 8 into the through hole 61 of the piston pin 6.

At Step 204, an inertance (a frequency response function obtained by a ratio between an exciting force input into the first and second dynamic vibration absorbers 81 and 82 and the acceleration generated by the exciting force) is measured using a known measurement device, thereby obtaining the resonance frequencies f1 and f2 of the first and second dynamic vibration absorbers 81 and 82. The measurement device may include a non-contact vibrometer, such as a Laser Doppler Vibrometer. The resonance frequencies f1 and f2 in the first and second dynamic vibration absorbers 81 and 82 can be obtained based on the frequency characteristics of the measured inertance.

At Step 205, it is determined whether or not the resonance frequencies f1 and f2 obtained at Step 204 are included within a desired range.

If the resonance frequencies f1 and f2 obtained in the first and second dynamic vibration absorbers 81 and 82 at Step 204 are not included within the desired range (the answer at Step 205 is NO), the masses of the bodies 83a and 83b of the first and second dynamic vibration absorbers 81 and 82 are adjusted using a known grinding device (for example, a device including a grinding stone) at Step 206. The mass of the body 83a or the mass of the body 83b may be adjusted or both the masses of the bodies 83a and 83b may be adjusted.

At Step 206, grinding reduces the masses of the bodies 83a and 83b. Therefore, at Step 202, it is preferable to prepare the bodies 83a and 83b having the dimensions larger than an objective dimension. (This makes the masses of the bodies 83a and 83b larger than an objective mass, making the resonance frequencies of the first and second dynamic vibration absorbers 81 and 82 smaller than the objective frequencies).

If the resonance frequencies f1 and f2 of the first and second dynamic vibration absorbers 81 and 82 obtained at Step 204 are included within the desired range (the answer at Step 205 is YES), the outer diameter of the piston pin 6 is grinded at Step 207. As can be seen, the reciprocative rotation mechanism of the engine 1 is manufactured.

Second Embodiment

Next, with reference to FIG. 10, it will be described how the first and second dynamic vibration absorbers 81 and 82 according to the first embodiment are designed.

In the spring mass model in FIG. 6, if a ratio μ1 of the mass m1 of the body 83a of the first dynamic vibration absorber 81 to Mr (a reciprocating inertial mass of the reciprocative rotation mechanism) (μ1=m1/Mr), and a ratio μ2 of the mass m2 of the body 83b of the second dynamic vibration absorber 82 to Mr (μ2=m2/Mr) are sufficiently smaller than 1, an interval w1 between two types of antiresonance and an interval w2 between two types of antiresonance (i.e., the difference between the peak frequencies) satisfy the following equation 1:

$$w_1 = g_1(\text{high}) - g_1(\text{low}) = 2\mu_1 \sqrt{\frac{3\mu_1 M_r K}{8(1+\mu_1)^3}}$$

$$w_2 = g_2(\text{high}) - g_2(\text{low}) = 2\mu_2 \sqrt{\frac{3\mu_2 M_r k}{8(1+\mu_2)^3}}$$

[Equation 1]

Thus, the larger the mass ratios μ1 and μ2 are, the larger the intervals w1 and w2 between the two types of antiresonance (hereinafter referred to as the antiresonance intervals) are.

The reciprocating inertial mass Mr of the reciprocative rotation mechanism can be considered as the sum of the mass of the piston 4, ⅓ of the mass of the connecting rod 5, the mass of the piston pin 6, and the mass of the fixture 84 of the first dynamic vibration absorber 81 (or the second dynamic vibration absorber 82). 3/1 of the mass of the connecting rod 5 is the mass of a rotational portion including the small end 51 in the connecting rod 5, and the rest mass (⅔ of the mass of the connecting rod 5) is the mass of a rotational portion including the large end 52 in the connecting rod 5. It can be said that the ratio μ1 of the mass m1 of the body 83a of the first dynamic vibration absorber 81 to the reciprocating inertial mass Mr and the ratio μ2 of the mass m2 of the body 83b of the second dynamic vibration absorber 82 to the reciprocating inertial mass Mr are sufficiently smaller than 1.

In the second embodiment, when the antiresonance peak frequency g1 (high) in the higher frequency region of the first dynamic vibration absorber 81 is completely or substantially consistent with the antiresonance peak frequency g2 (low) in the lower frequency region of the second dynamic vibration absorber 82, at least one of the antiresonance interval w1 occurring in the first dynamic vibration absorber 81 or the antiresonance interval w2 occurring in the second dynamic vibration absorber 82 is changed. This allows the peak frequency g1 (high) and the peak frequency g2 (low) to have different values from each other.

In the second embodiment, the resonance frequencies of the first and second dynamic vibration absorbers 81 and 82 are respectively allowed to completely or substantially coincide with the first and second noise frequencies FA and FB. In order to do so, the masses m1 and m2 of the bodies 83a and 83b of the first and second dynamic vibration absorbers 81 and 82 are changed such that the antiresonance peak frequencies g1 (high) and g2 (low) substantially have different values. This allows the mass ratios μ1 and μ2 and in turn, the antiresonance intervals w1 and w2 to have desired values. In this state, the spring constants k1 and k2 of the arms 85a and 85b (the springs) are changed such that the resonance frequency f1 (=(½π)·√(k1/m1)) of the first dynamic vibration absorber 81 is completely or substantially consistent with the first noise frequency FA and the resonance frequency f2 (=(½π)·√(k2/m2)) of the second dynamic vibration absorber 82 is completely or substantially consistent with the second noise frequency FB.

The antiresonance intervals w1 and w2 may be widened or narrowed from the original value (the value at which the peak frequencies g1 (high) and g2 (low) are consistent with each other). The antiresonance intervals w1 and w2 are respectively widened by increasing the mass ratios μ1 and μ2, and are respectively narrowed by reducing the mass ratios μ1 and μ2.

Figure 10:
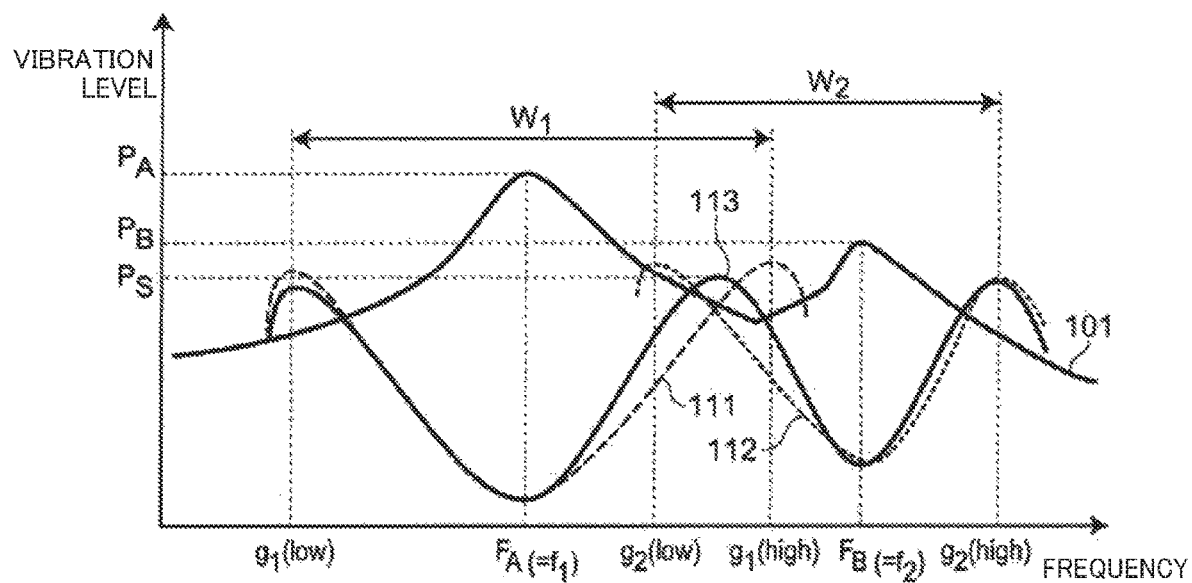
FIG. 10 is a graph corresponding to FIG. 7 and illustrating the design of first and second dynamic vibration absorbers according to a second embodiment.

In the example of FIG. 10, the antiresonance intervals w1 and w2 are widened with the resonance frequencies of the first and second dynamic vibration absorbers 81 and 82 respectively consistent with the first and second noise frequencies FA and FB, thereby allowing the peak frequencies g1 (high) and g2 (low) to substantially have different values. FIG. 10 shows that the vibration level PS at which the superpositioned antiresonance peaks is smaller than the vibration levels PA and PB.

As can be seen, the second embodiment allows for reducing the vibration levels at the first and second noise frequencies FA and FB, and reducing an increase in the vibration levels due to the interaction of the two types of antiresonance with each other. This can effectively reduce noise generated during the operation of the engine 1.

As described above, in the second embodiment, the antiresonance intervals w1 and w2 may be widened or narrowed from the original value (the value at which the peak frequencies g1 (high) and g2 (low) are consistent with each other) as a reference such that the peak frequencies g1 (high) and g2 (low) have substantially different values from each other. Preferably, just like the example shown in FIG. 10, the antiresonance interval w1 in the first dynamic vibration absorber 81 and the antiresonance interval w2 in the second dynamic vibration absorber 82 are widened, such that the antiresonance peak frequency g1 (high) in the higher frequency region of the first dynamic vibration absorber 81 is higher than the antiresonance peak frequency g2 (low) in the lower frequency region of the second dynamic vibration absorber 82. As a result, the antiresonance vibration level in the higher frequency region of the first dynamic vibration absorber 81 can be reduced by the vibration in the second dynamic vibration absorber 82, and the antiresonance vibration level in the lower frequency region of the second dynamic vibration absorber 82 can be reduced by the vibration in the first dynamic vibration absorber 81.

In the second embodiment, if the antiresonance intervals w1 and w2 are too widened, the advantage of reducing the vibration levels PA and PB at the first and second noise frequencies FA and FB by the first and second dynamic vibration absorbers 81 and 82 cannot be obtained, sufficiently. Further, for example, the antiresonance peak frequency g1 (high) may coincide with the second noise frequency FB or the antiresonance peak frequency g2 (low)

may coincide with the first noise frequency FA, resulting in generation of a new noise source. Accordingly, the antiresonance intervals w1 and w2 are set such that the maximum value of the vibration level in the actual vibration curve 113 obtained by superposition of the resonance curves 111 and 112 is smaller than the vibration levels PA and PB at the first and second noise frequencies FA and FB.

The reciprocative rotation mechanism according to the second embodiment can be manufactured by the same or similar method to the first embodiment.

OTHER EMBODIMENTS

Although the technique of the present disclosure has been described by way of illustrative embodiments, the technique of the present disclosure is not limited to those embodiments. Various modifications and design changes may be added in the above embodiments. Other embodiments may be made by combining some features described in the above embodiments.

For example, in the second embodiment, the antiresonance intervals w1 and w2 are changed with the resonance frequencies of the first and second dynamic vibration absorbers 81 and 82 respectively completely or substantially consistent with the first and second noise frequencies FA and FB. However, this is merely an example of the present disclosure. Alternatively, the resonance frequencies f1 and f2 of the first and second dynamic vibration absorbers 81 and 82 may be shifted from the first and second noise frequencies FA and FB (using the method of the embodiment shown in FIG. 8), and further, the antiresonance intervals w1 and w2 may be changed, thereby allowing the antiresonance peak frequency g1 (high) in the higher frequency region of the first dynamic vibration absorber 81 to substantially have a different value from the antiresonance peak frequency g2 (low) in the lower frequency region of the second dynamic vibration absorber 82. In this embodiment, the resonance frequencies f1 and f2 can be prevented from being shifted too much from the first and second noise frequencies FA and FB. Thus, the first and second dynamic vibration absorbers 81 and 82 can reliably reduce the increase in the vibration levels due to the interaction of the two types of antiresonance with each other while reliably reducing the vibration levels at the first and second noise frequencies FA and FB. This can more freely design the first and second dynamic vibration absorbers 81 and 82 to effectively reduce noise generated during the operation of the engine.

In the above first and second embodiments, the damping member 8 is disposed in the through hole 61 of the piston pin 6. However, this is merely an example of the present disclosure. Alternatively, for example, the damping member 8 may be provided to the connecting rod 5 if the bodies 83a and 83b of the first and second dynamic vibration absorbers 81 and 82 need to be made large enough not to be housed in the through hole 61 of the piston pin 6. In this configuration, the fixture 84 of the damping member 8 is fixed to the connecting rod 5. Disposing the damping member 8 in the connecting rod 5 at a position closer to the small end 51 allows for integrating the piston 4, the piston pin 6, and the small end 51 of the connecting rod 5 together, thereby advantageously substantially preventing from resonating with respect to the large end 52 of the connecting rod 5.

Figure 11:
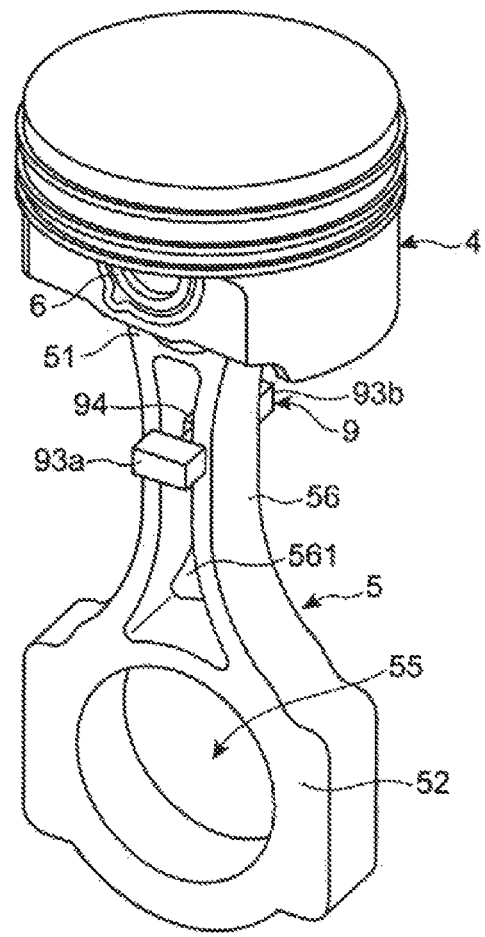
FIG. 11 is a perspective view of the reciprocative rotation mechanism in a situation where a connecting rod is provided with a damping member.
Figure 12:
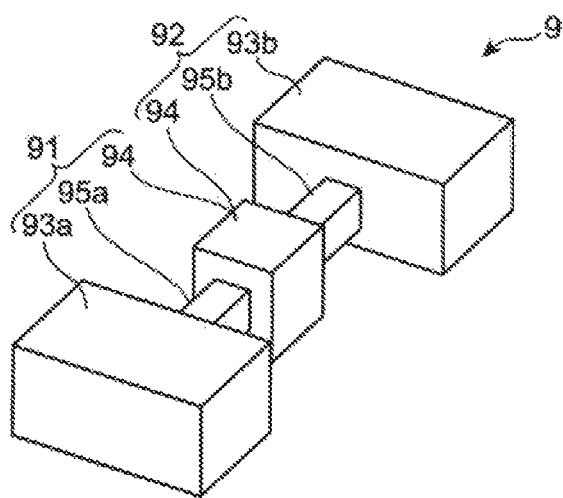
FIG. 12 is a perspective view of the damping member provided to the reciprocative rotation mechanism of FIG. 11.

In the configuration in which the damping member 8 is disposed in the connecting rod 5, for example, as shown in FIG. 11, the connecter 56 of the connecting rod 5 may be provided with a through hole 561 extending vertically while being mounted in the vehicle body, and a damping member 9 may be fixed into the through hole 561. The damping member 9 has the substantially same configuration as the damping member 8 except for details. The operation of the damping member 9 is the same or similar to that of the damping member 8. As shown in FIG. 12, the damping member 9 includes bodies 93a and 93b, a fixture 94, and arms 95a and 95b. The damping member 9 has a first dynamic vibration absorber 91 including the body 93a, the fixture 94, and the arm 95a, and a second dynamic vibration absorber 92 including the body 93b, the fixture 94, and the arm 95b. That is to say, the first dynamic vibration absorber 91 and the second dynamic vibration absorber 92 share the fixture 94, and are integrated with each other by the fixture 94. The fixture 94 of the damping member 9 may be press-fitted into or fastened to the inner peripheral surface of the through hole 561.

In the above first and second embodiments, the two dynamic vibration absorbers 81 and 82 share the fixture 84 and are integrally formed together. This embodiment allows for reducing the number of the components, and manufacturing costs. However, this is a mere example, and the two dynamic vibration absorbers 81 and 82 may be separately provided as different parts.

In the above first and second embodiments, the second dynamic vibration absorber 82 is comprised of one single member, and the body 83a of the first dynamic vibration absorber 81 is comprised of two members (the shaft 831 and the cap 832). However, this is not limiting. Alternatively, the first dynamic vibration absorber 81 and the second dynamic vibration absorber 82 may be comprised of one single member. In this example, the damping member 8 is comprised of one single member, as a whole. In this example, the outer diameters of the bodies 83a and 83b may be smaller than the inner diameter of the press-fitted portion 62 such that one single member can be assembled to the through hole 61 of the piston pin 6. In addition, both the first dynamic vibration absorber 81 and the second dynamic vibration absorber 82 may be comprised of more than two members (the shaft and the cap).

The foregoing embodiments are merely preferred examples in nature, and the scope of the technique disclosed in this specification should not be interpreted in a limited manner. The scope of the technique disclosed in this specification is defined by the appended claims, and all variations and modifications belonging to a range equivalent to the range of the claims are within the scope of the technique disclosed in this specification.

What is claimed is:

1. An engine reciprocative rotation mechanism, comprising:
   a piston reciprocating in a cylinder;
   a connecting rod connecting the piston and a crankshaft together;
   a piston pin connecting the piston and the connecting rod together, and having a through hole;
   a first dynamic vibration absorber provided to the piston or the connecting rod, and configured to reduce a vibration level, which is generated during an operation of the engine, at a first resonance frequency; and
   a second dynamic vibration absorber provided to the piston or the connecting rod, and configured to reduce a vibration level, which is generated during the operation of the engine, at a second resonance frequency higher than the first resonance frequency, wherein
   the first dynamic vibration absorber and the second dynamic vibration absorber are comprised of a damper which is provided in the through hole of the piston pin, the damper includes
a fixture fixed to the through hole,
a first body constituting the first dynamic vibration absorber,
a first arm constituting the first dynamic vibration absorber, connecting the fixture and the first body, and having a smaller diameter than the first body,
a second body constituting the second dynamic vibration absorber, and
a second arm constituting the second dynamic vibration absorber, connecting the fixture and the second body, and having a smaller diameter than the second body,
the second dynamic vibration absorber is higher in resonance frequency than the first dynamic vibration absorber, and
a mass of the first body, a spring constant of the first arm, a mass of the second body, and a spring constant of the second arm are configured such that at least one of the resonance frequency of the first dynamic vibration absorber or the resonance frequency of the second dynamic vibration absorber differs from associated at least one of the first resonance frequency or the second resonance frequency, and a peak frequency of antiresonance occurring in a higher frequency region of the first dynamic vibration absorber than the resonance frequency of the first dynamic vibration absorber is substantially different from that of antiresonance occurring in a lower frequency region of the second dynamic vibration absorber than the resonance frequency of the second dynamic vibration absorber.

2. The engine reciprocative rotation mechanism of claim 1, wherein
a mass of the first body, a spring constant of the first arm, a mass of the second body, and a spring constant of the second arm are configured such that at least one of the resonance frequency of the first dynamic vibration absorber or the resonance frequency of the second dynamic vibration absorber differs from associated at least one of the first resonance frequency or the second resonance frequency, and the peak frequency of antiresonance occurring in the higher frequency region of the first dynamic vibration absorber than the resonance frequency of the first dynamic vibration absorber is higher than that of antiresonance occurring in the lower frequency region of the second dynamic vibration absorber than the resonance frequency of the second dynamic vibration absorber.

3. A method for manufacturing an engine reciprocative rotation mechanism which includes:
a piston reciprocating in a cylinder;
a connecting rod connecting the piston and a crankshaft together;
a first dynamic vibration absorber provided to the piston or the connecting rod, and configured to reduce a vibration level, which is generated during an operation of the engine, at a first resonance frequency; and
a second dynamic vibration absorber provided to the piston or the connecting rod, and configured to reduce a vibration level, which is generated during the operation of the engine, at a second resonance frequency,
the second dynamic vibration absorber being higher in resonance frequency than the first dynamic vibration absorber, the method comprising:
a preparing step of preparing the first and second dynamic vibration absorbers, the preparing step including a shifting step of shifting at least one of the resonance frequency of the first dynamic vibration absorber or the resonance frequency of the second dynamic vibration absorber from associated at least one of the first resonance frequency or the second resonance frequency when a peak frequency of antiresonance occurring in a higher frequency region of the first dynamic vibration absorber than the resonance frequency of the first dynamic vibration absorber is substantially consistent with that of antiresonance occurring in a lower frequency region of the second dynamic vibration absorber than the resonance frequency of the second dynamic vibration absorber.

4. The method of claim 3, wherein
the shifting step from the associated one of the first resonance frequency or the second resonance frequency is a step of shifting at least one of the resonance frequency of the first dynamic vibration absorber or the resonance frequency of the second dynamic vibration absorber from associated at least one of the first resonance frequency or the second resonance frequency to associated at least one of the higher frequency region or the lower frequency region.

5. The method of claim 3, wherein
the first and second dynamic vibration absorbers each have a body, a fixture fixed to the piston or a piston pin, and a connecter elastically connecting the body and the fixture together,
the preparing step further includes a changing step of changing at least one of a ratio of a mass of the body of the first dynamic vibration absorber to a reciprocating inertial mass of the reciprocative rotation mechanism or a ratio of a mass of the body of the second dynamic vibration absorber to the reciprocating inertial mass of the reciprocative rotation mechanism, thereby changing associated at least one of an interval of two types of antiresonance occurring in the first dynamic vibration absorber or an interval of two types of antiresonance occurring in the second dynamic vibration absorber.

6. The engine reciprocative rotation mechanism of claim 1, wherein
the mass of the first body and the spring constant of the first arm are configured such that the resonance frequency of the first dynamic vibration absorber is in the higher frequency region, and
the mass of the second body and the spring constant of the second arm are configured such that the resonance frequency of the second dynamic vibration absorber is in the lower frequency region.

* * * * *